United States Patent
Lin et al.

(10) Patent No.: US 8,344,916 B2
(45) Date of Patent: Jan. 1, 2013

(54) SYSTEM AND METHOD FOR SIMPLIFYING TRANSMISSION IN PARALLEL COMPUTING SYSTEM

(75) Inventors: Haibo Lin, Beijing (CN); Jia Jia Wen, Beijing (CN); Zhe Xiang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/016,044

(22) Filed: Jan. 28, 2011

(65) Prior Publication Data

US 2011/0208947 A1    Aug. 25, 2011

(30) Foreign Application Priority Data

Jan. 29, 2010    (CN) .......................... 2010 1 0104978

(51) Int. Cl.
    *H03M 7/30*    (2006.01)
(52) U.S. Cl. .......................................... 341/87; 707/101
(58) Field of Classification Search .................. 341/106, 341/87, 50, 51; 707/101, 9, 1, 10
See application file for complete search history.

(56) References Cited

U.S. PATENT DOCUMENTS

| | | | |
|---|---|---|---|
| 6,480,125 B2* | 11/2002 | Rub et al. | 341/50 |
| 6,928,428 B1 | 8/2005 | De Vries | |
| 8,201,142 B2* | 6/2012 | Isard et al. | 717/106 |
| 8,209,664 B2* | 6/2012 | Yu et al. | 717/119 |
| 2002/0032676 A1 | 3/2002 | Reiner et al. | |
| 2007/0271547 A1* | 11/2007 | Gulko et al. | 717/106 |
| 2008/0320019 A1* | 12/2008 | Bireley et al. | 707/101 |
| 2010/0281078 A1* | 11/2010 | Wang et al. | 707/812 |

OTHER PUBLICATIONS

Gosink, "Data Parallel Bin-Based Indexing for Answering Queries on Multi-Core Architectures," Lecture Notes in Computer Science, 2009, vol. 5566/2009, pp. 110-129.

* cited by examiner

*Primary Examiner* — Peguy Jean Pierre
(74) *Attorney, Agent, or Firm* — Vazken Alexanian (57) ABSTRACT

Simplifying transmission in a distributed parallel computing system. The method includes: identifying at least one item in a data input to the parallel computing unit; creating a correspondence relation between the at least one item and indices thereof according to a simplification coding algorithm, where the average size of the indices is less than the average size of the at least one item; replacing the at least one item with the corresponding indices according to the correspondence relation; generating simplified intermediate results by the parallel computing unit based on the indices; and transmitting the simplified intermediate results. The invention also provides a system corresponding to the above method.

21 Claims, 3 Drawing Sheets

SYSTEM AND METHOD FOR SIMPLIFYING TRANSMISSION IN PARALLEL COMPUTING SYSTEM

CROSS-REFERENCE TO RELATED APPLICATIONS

This application claims priority under 35 U.S.C. §119 to Chinese Patent Application No. 201010104978.4 filed Jan. 29, 2010, the entire contents of which are incorporated by reference herein.

BACKGROUND OF THE INVENTION

1. Field of the Invention

The present invention relates to distributed parallel computing system, and more particularly, to simplification of transmission in the distributed parallel computing system.

2. Description of the Related Art

Development of information technology provides people with richer and more powerful applications and services. Meanwhile it requires higher demand on the computing capability of processing devices. Although the running speed of a single processor has been enhanced significantly, distributed parallel computing becomes a practical solution when facing a huge amount of information and data.

For example, the processing of a large number of data is involved in various statistics methods. Web page ranking is a basic and widely exploited method to estimate the status of a web site or certain content. Word frequency statistics is another example of a hot topic. Further, various intelligent analysis, including user behavior analysis, relation analysis, recommendation system and content customization and so on, are all based on a large amount of data and information. In the above examples, the input to the processing system is generally a series of files, such as, web log file, and its output is information extracted from these inputs. As for a commercial web site, a log file generated in a day may exceed 1T bytes (1000G). Such amount of data can hardly be processed in a traditional manner.

In order to process large amount of data, distributed parallel computing is suggested for dispersing one processing task into multiple processors and executing parallel processing simultaneously. Currently, there are many implementation manners of large scale parallel computing, in which the most important and general ones are the MapReduce model by Google and the Dryad model by Microsoft.

MapReduce is a simple parallel computing model, and named from its two core operations, Map and Reduce. The concepts are derived from functional programming. In brief, Map is the process of mapping a group of data to another group of data one by one with the mapping rule specified by a function defined by users. Reduce is the process of combining and reducing a group of data according to the function defined by users. During Map, we enable data to be performed in parallel, that is, data is divided; while in Reduce, we combine the divided data together. In other words, Map is a dividing process, while Reduce corresponds to a combining process. With these dividing and combining processes, a complicated and huge task can be divided into many jobs performing operation in parallel, and then results of operation in parallel are combined to provide the desired result.

Figure 1:
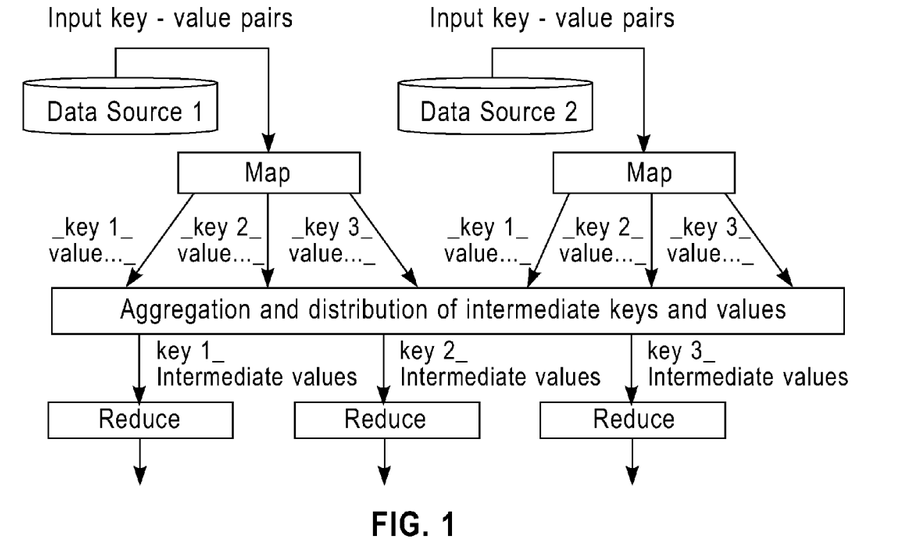
FIG. 1 shows a schematic view of basic architecture of the MapReduce model in the art.

FIG. 1 shows a schematic view of basic architecture of MapReduce model in the art. In the Map Reduce model as shown in FIG. 1, each mapping unit reads input data in a form of key-value pair (key, value) from corresponding data source, and maps the input key-value pair to a new group of key-value pair according to a function defined by the user, i.e., the key-value pairs including key1, key2, key3, called as intermediate key-value pairs. Generally, the mapping unit stores the generated intermediate key-value pairs in local. Afterwards, in the stage of reducing, the intermediate key-value pairs having the same key are sent to the same reduce unit, and the reducing unit synthesizes the results.

The detailed process of mapping and reducing will be described with reference to an example. In this example, the task to be done is to get statistics of occurrence times of each word in a set of documents. For such a task, each document in the set of documents can be assigned to a mapping unit to perform mapping process. Input of the mapping process is each document in the form of key-value pairs, and the target of mapping is to output the occurrence of each word in the input document to an intermediate file. More particularly, the input key-value pairs can be set as follows: the key corresponds to the name of document and the value corresponds to the content of document.

Further, the mapping function can be defined as generating intermediate key-value pair (w, 1) for each word w in the value. Based on this, if content of a document is "hello Beijing, hello world", then the acquired intermediate key-value pairs are (hello, 1), (beijing, 1), (hello, 1), (world, 1). Afterwards, in the stage of reducing, the reducing unit processes and synthesizes the sequence of words and occurrence times, and acquires the final statistic results: (hello, 2), (beijing, 1), (world, 1).

Figure 2:
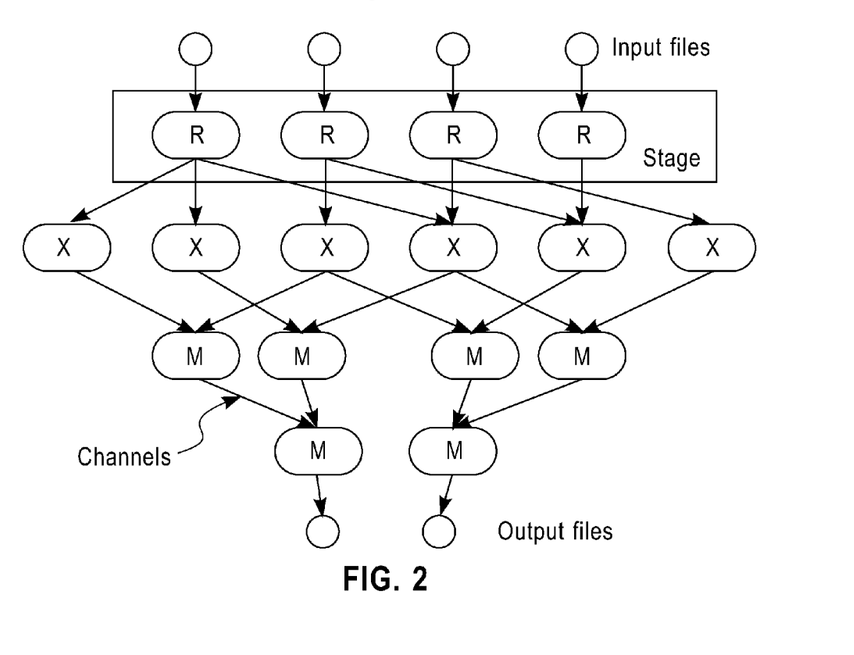
FIG. 2 shows a schematic view of basic architecture of the Dryad model in the art.

Like MapReduce, the Dryad model also dispatches a task into multiple processing units to perform operation. FIG. 2 shows a schematic view of a basic architecture of the Dryad model in the art. As shown, the input documents are distributed to multiple processing units, and the final processing result is obtained by the division and the inverse combination in multiple stages layer by layer. Comparing with the MapReduce model in FIG. 1, the evident difference between them is that, the MapReduce model is a typical two-stage procedure, i.e., stages of mapping and reducing; the flowchart of the Dryad job contains multiple processing stages.

Whether it is the MapReduce model, Dryad model, or other distributed parallel computing method, the transmission of intermediate results is important among different processing stages. Taking MapReduce as an example, during the mapping stage, the mapping unit will generate a large number of intermediate key-value pairs. Such intermediate key-value pairs need to be sent to the proper reducing unit for further processing, which causes the I/O problem among different processing units. Since the number of intermediate key-value pairs is huge, the transmission of such data generally requires a large amount of I/O resources of network, and thus reduces efficiency of parallel computing.

For example, in statistic analysis of word counts in Wikipedia, supposed it employs the MapReduce model, and 5 blade machines sharing 1 Gbps network. During the processing, it can be detected that, between mapping/reducing stages, I/O of each machine has reached 24 MB/s, and the total consumption of network 10 of 5 machines has reached about 1 Gb/s. Such large consumption of network 10 becomes a bottleneck of the whole parallel computing, and reduces the performance of the whole parallel computing system. Thus, a method and system is desirable for improving the current parallel computing approach so as to reduce I/O consumption and enhance computing performance.

SUMMARY OF THE INVENTION

The present invention simplifies I/O transmission in a parallel computing system.

According to one aspect of the present invention, a method for simplifying transmission in a distributed parallel computing system is provided. The method includes: identifying at least one item in a data input to the parallel computing unit; creating a correspondence relation between the at least one item and indices thereof according to a simplification coding algorithm, where the average size of the indices is less than the average size of the at least one item; replacing the at least one item with the corresponding indices according to the correspondence relation; generating simplified intermediate results by the parallel computing unit based on the indices; and transmitting the simplified intermediate results.

According to another aspect of the present invention, a system for simplifying transmission in a distributed parallel computing system is provided. The system includes a simplifying apparatus which contains: an item identifying unit configured to identify at least one item in a data input to the parallel computing unit; a correspondence creating unit configured to create the correspondence relation between the at least one item and indices thereof according to a simplification coding algorithm, where the average size of the indices is less than the average size of the at least one item; and an item replacing unit configured to replace the at least one item with corresponding indices according to the correspondence relation, such that the parallel computing unit can generate simplified intermediate results based on the indices, and transmit the simplified intermediate results.

DETAILED DESCRIPTION OF THE PREFERRED EMBODIMENTS

The present invention will be described in detail in conjunction with preferred embodiments with reference to accompany drawings. It should be noted that the description is only for purpose of illustration instead of limiting the scope of the invention.

With the system and method in the present invention, intermediate results in a parallel computing system are simplified, I/O problems due to the transmission of intermediate results are effectively eliminated, and the overall efficiency of the parallel computing system is improved.

Figure 3:
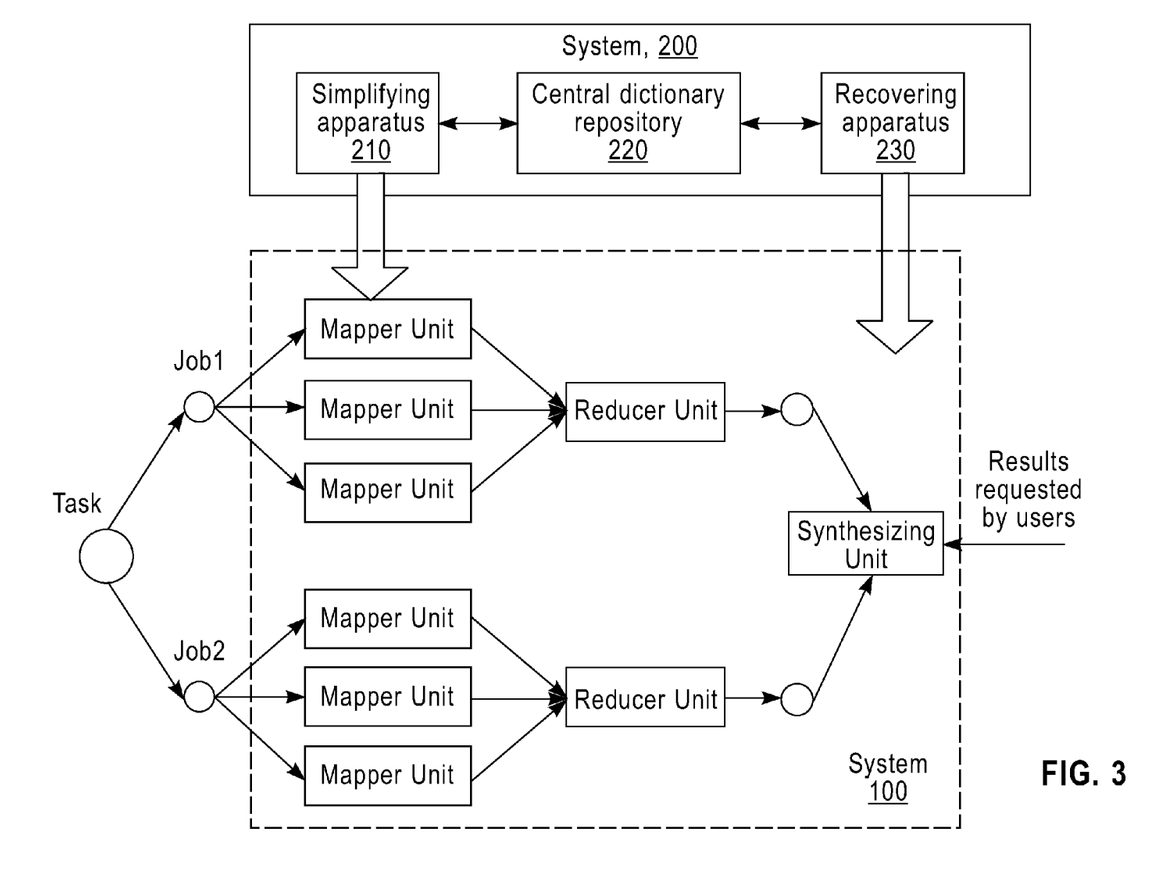
FIG. 3 shows a schematic view of an improved parallel computing system according to an embodiment of the present invention.

Referring to FIG. 3, a schematic view is shown of an improved parallel computing system according to an embodiment of the present invention. As shown in FIG. 3, the improved system includes a computing system 100 and a transmission simplifying system 200. It should be understood that, the division and respective structures of the shown computing system 100 and transmission simplifying system 200 are intended to be illustrative in functionality, but not intended to restrict their actual physical structures and physical platforms.

In FIG. 3, the computing system 100 is shown taking structure of the MapReduce model as example. However, it should be understood that, the computing system 100 can also use other parallel computing models. More particularly, in the computing system 100 shown as the MapReduce model, one input task is divided into multiple jobs (two in the example of FIG. 3) that are relatively separate, and then each job is dispersed into multiple mapper units for processing. These mapper units map the input key-value pairs to intermediate key-value pairs according to function defined by user, and generate a number of intermediate results. Then, these intermediate results are sent to corresponding reducer units. The reducer units then reduce and combine the intermediate key-value pairs, and send the combined result to a synthesizing unit. The synthesizing unit generates a final result based on the combined result, and presents the final result in response to the request for acquiring the final result from the user. It should be understood that the above described multiple mapper units and reducer units can be implemented in the same one or a plurality of different physical machines or virtual machines, and perform the required process in parallel.

Those skilled in the art can understand that, the computing system 100 in the form of MapReduce is only an example, and the computing system 100 is not limited to the computing system using the MapReduce model. In other parallel computing systems, such as in the Dryad model, the computing system 100 is not limited to the process having two stages of mapping and reducing, but includes the process of multiple stages. For purpose of clear expression without loss of generality, we assume that the computing system may contain n stages during each of which there are a plurality of processing units to perform computation and processing, including but not limited to mapping and reducing operations. Such processing units can be commonly called parallel computing units. These parallel computing units can be distributed among multiple computers and processors.

In order to solve I/O problems among parallel computing units in different stages (such as among mapper units and reducer units) in the computing system 100, according to one embodiment of the present invention, an additional transmission simplifying system 200 is provided for the computing system 100. As shown in FIG. 3, the transmission simplifying system 200 includes a simplifying apparatus 210 for simplifying intermediate results of parallel computing units, thereby reducing the size of the intermediate results to be transmitted; a central dictionary repository 220 for storing the correspondence relation before and after simplification; and a recovering apparatus 230 for recovering the simplified processing results. The respective apparatus in the transmission simplifying system 200 will be further described in detail below.

Figure 4:
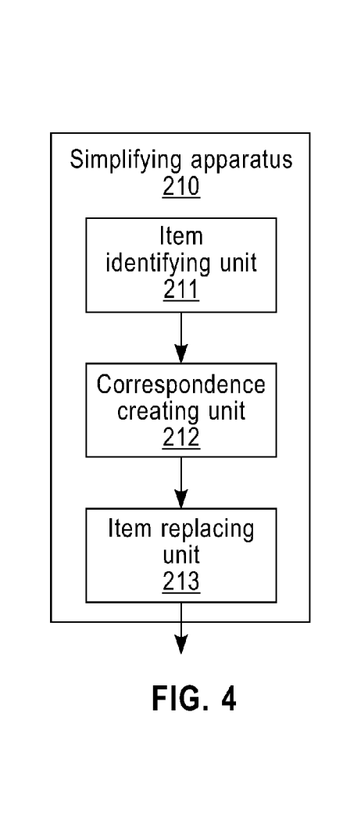
FIG. 4 shows a block diagram of the simplifying apparatus 210 according to an embodiment of the present invention.

FIG. 4 shows a block diagram of the simplifying apparatus 210 according to an embodiment of the present invention. As shown, the simplifying apparatus 210 includes: an item identifying unit 211 configured to identify items in the input data; a correspondence creating unit 212 configured to create a correspondence relation between the items and indices according to a simplification coding algorithm with the average size of the indices being less than average size of the items; an item replacing unit 213 configured to replace the items with the indices according to the correspondence relation, so that the parallel computing units can generate simplified intermediate results based on the indices.

The configuration and operation of the simplifying apparatus 210 will be further described in conjunction with the MapReduce model. In the case of the MapReduce parallel computing system, the simplifying apparatus 210 can be set in each mapper unit. As described above, the mapper unit acquires input data in the form of a key-value pair, and maps the input key-value pairs to intermediate key-value pairs according to the defined function. For instance, in the example of obtaining the statistic of occurrence times of words described in the description of the related art, the mapper unit can map the input document "hello Beijing, hello world" to multiple intermediate key-value pairs (hello, 1), (beijing, 1), (hello, 1), (world, 1). In this example, the simplifying apparatus 210 can simplify the intermediate key-value pairs generated by the mapper unit, and thus reduce the size of the intermediate results.

More particularly, the item identifying unit 211 identifies items in the input data, i.e., contents of the input key-value pairs. In the above example of obtaining the statistics of words, the item identifying unit 211 identifies each word in the input document as an input item.

Next, the correspondence creating unit 212 creates a correspondence relation between the items and indices according to a specific simplification coding algorithm, and makes the average size of the items bigger than the average size of the indices. The size of items or indices can be size of occupied storage space, size of occupied transmission bandwidth and so on. Accordingly, the average size can be a mathematic average, a weighting average (based on occurrence frequency) and an average acquired by various averaging approaches according to forms and features of items and indices. In the case that the items and indices are all character strings, the size corresponds to the length of the character string. That is, in the case of the character string, on average, lengths of indices are shorter.

In the field of data simplification coding, a dictionary is usually created to include multiple entries, each of which records the correspondence relation between an item before simplification coding and an index after simplification coding. Thus, it can be seen that, the correspondence creating unit 212 is configured to construct entries of a compression dictionary according to a specific simplification coding algorithm. For example, in above example of obtaining statistics of words, the correspondence creating unit 212 can map the identified item "hello" to the index "11", the item "beijing" to "22", and "world" to "33" based on a certain algorithm.

After the correspondence relation between items and indices is created, the correspondence creating unit 212 can register such a correspondence relation to the central dictionary repository 220. In one embodiment of the present invention, for each newly constructed item, the correspondence creating unit 212 registers it to the central dictionary repository 220 in real time. In another embodiment of the present invention, the correspondence creating unit 212 performs the registering of items periodically. In order to avoid constructing repeated items, for each of the identified items, the correspondence creating unit 212 can first check whether the correspondence relation has already been created, and construct a new entry only in the case that the correspondence relation has not been created.

In order to perform such checking, in one embodiment of the present invention, the correspondence creating unit 212 looks up in the central dictionary repository 220 and determines whether there are corresponding entries. In another embodiment of the present invention, the correspondence creating unit 212 further stores the created correspondence relation in local, and first checks the correspondence relation stored in local to speedup the above check process. Thus, in the above example, after the correspondence creating unit 212 creates the correspondence relation of "hello" and "11" for the first item, it is unnecessary to recreate the entry of correspondence relation while this item is encountered again.

In order to construct the correspondence relation between items and "shorter" indices, the correspondence creating unit 212 can use various simplification coding algorithms, as long as the average size of the indices is less than the average size of the items. The examples of simplification coding algorithm will be given below.

After the correspondence relation between the items and indices is created, the item replacing unit 213 can replace items processed by the mapper unit with shorter indices after simplification coding based on such correspondence relation, so that the mapper unit can generate simplified intermediate key-value pairs. Such replacement can be performed before or after mapping process. In above example of getting statistics of words, according to one embodiment of the present invention, the item replacing unit 213 can perform the replacement of items after the mapping process is performed and intermediate key-value pairs (hello, 1), (beijing, 1), (hello, 1), (world, 1) are generated, so as to convert them to simplified intermediate key-value pairs (11, 1), (22, 1) and so on. In another embodiment of the present invention, the item replacing unit 213 performs the replacement of items after input items are identified and before the mapping process is performed, so as to convert input data to "11 22, 11 33". Thus, the mapper unit can perform a mapping process on the simplified input items, so as to directly generate simplification coded intermediate key-value pairs.

From above description in conjunction with specific examples, it can be seen that the simplifying apparatus 210 simplifies the intermediate key-value pairs generated by the mapper unit by means of operations of the item identifying unit 211, correspondence creating unit 212 and item replacing unit 213, such that the size of intermediate key-value pairs and the occupied space are reduced significantly. Generally, the mapper unit can store the generated intermediate key-value pairs in local, and send them to the proper reducer unit as needed. Thus, the simplification coding on intermediate key-value pairs not only saves the storage space locally in the mapper unit, but also reduces the I/O pressure when they are sent to reducer units subsequently.

Although the simplifying apparatus 210 is described with respect to the MapReduce model and in conjunction with specific examples of the statistics of words, those skilled in the art can understand that the simplifying apparatus 210 can be similarly applied to other computing tasks and other parallel computing systems. As to a general parallel computing system containing n stages described above, the simplifying apparatus 210 can be set in any parallel computing unit of any stage in the computing system, as long as the parallel computing unit generates intermediate results that are to be transmitted among different parallel computing units. In this case, the item identifying unit 211 identifies items in the data inputted into the parallel computing unit; the correspondence creating unit 212 creates the correspondence relation between the items and indices according to a specific simplification coding algorithm; the item replacing unit 213 replaces the items with the indices according to the correspondence relation, so that the parallel computing unit can generate simplified intermediate results. Since the input acquired by the parallel computing unit is not limited to the form of key-value pairs, the simplifying apparatus 210 simplifies various data items that have possibilities to be simplified, not limited to keys in key-value pairs in above example, according to the form of input data. Accordingly, the simplifying apparatus 210 achieves the simplification on intermediate results, so as to reduce I/O consumption related to intermediate results transmission in a parallel computing system.

As described, during the simplification process on intermediate results in the simplifying apparatus 210, a large amount of correspondence relations, or called as dictionary entries, is generated between items before simplification and indices after simplification. The simplifying apparatus 210 can register these dictionary entries with the central dictionary repository 220 for management.

In general, the central dictionary repository 220 is used for storing correspondence relations before and after simplification. Typically, the central dictionary repository 220 stores the above correspondence relations in the form of a dictionary, and the dictionary includes a plurality of entries, each of which records the correspondence between an item and an index with the average size of the plurality of items larger than the average size of the corresponding plurality of indices in the dictionary. Entries in the central dictionary repository 220 can be originated from the simplifying apparatus 210. A plurality of simplifying apparatus 210 can register their constructed entries with the central dictionary repository 220 simultaneously. In one embodiment of the present invention, the central dictionary repository 220 is an entity separate from the simplifying apparatus 210 and the recovering apparatus 230. The simplifying apparatus 210 and the recovering apparatus 230 can communicate with the central dictionary repository 220 in various manners of wired or wireless communications respectively.

In order to avoid possible registering repetition due to simultaneous registering by the plurality of simplifying apparatus 210, in one embodiment of the present invention, the central dictionary repository 220 is further configured to check whether the same entry is already registered when a new dictionary entry to be registered is received. Further, various simplification coding algorithms that might be used by the simplifying apparatus 210 have different possible collision ratio. In this regard, the central dictionary repository 220 is further configured to check whether a new entry conflicts with any existing entry when the new entry is received, and notify the simplifying apparatus 210 that attempts to register the new entry of simplifying it again in case of conflict. Accordingly, it assures a unique correspondence between original items and simplified indices, so as to make sure this simplification recoverable.

Figure 5:
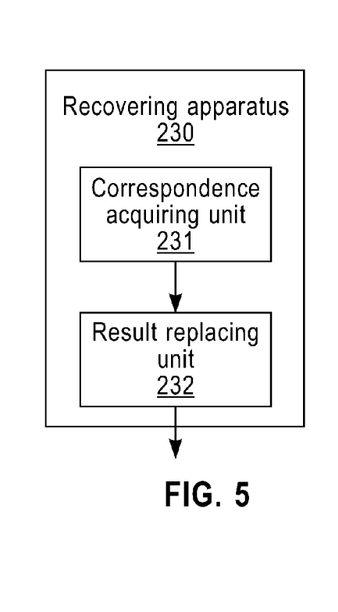
FIG. 5 shows a block diagram of the recovering apparatus 230 according to an embodiment of the present invention.

Further, in order to recover the data when reading the processing results, the recovering apparatus 230 is provided corresponding to the simplifying apparatus 210. FIG. 5 shows a block diagram of the recovering apparatus 230 according to an embodiment of the present invention. As shown in FIG. 5, the recovering apparatus 230 includes a correspondence acquiring unit 231 and a result replacing unit 232. The recovering apparatus 230 will be described with reference to the MapReduce model as an example.

In the MapReduce structure in FIG. 3, the recovering apparatus 230 can be set in the synthesizing unit, and is used for recovering the simplified processing results to original results. More particularly, during the process of generating intermediate results, the simplifying apparatus 210 creates the correspondence relation between original items and indices, and replaces items in data with shorter indices according to the correspondence relation. Correspondingly, during the recovering process, the correspondence acquiring unit 231 first acquires the correspondence relation between the above original items and indices, and then the result replacing unit 232 replaces indices in processing results with original items according to the acquired correspondence relation, so as to generate processing results readable to users. In one embodiment of the present invention, the simplifying apparatus 210 registers the above correspondence relation with the central dictionary repository. Correspondingly, the correspondence acquiring unit 231 acquires the correspondence relation between original items and indices by looking up entries in the central dictionary repository 220.

In the example of getting the statistics of words, the mapper unit generates simplified intermediate key-value pairs (11, 1), (22, 1) and so on through the simplifying apparatus 210. With regular processing on intermediate key-value pairs by the reducer unit, the synthesizing unit will acquire such statistics results (11, 2), (22, 1), (33, 1). However, such results have no meaning for users. Thus, in one embodiment of the present invention, once the synthesizing unit acquires processing results, the correspondence acquiring unit 231 in the recovering apparatus 230 refers to the central dictionary repository 220, acquires the correspondence relation related to the processing results, and sends such correspondence relation to the result replacing unit 232, and then the result replacing unit 232 performs a replacement based on such correspondence relation and acquires processing results (hello, 2), (beijing, 1), (world, 1) readable to users.

Since the finally acquired processing results are often very large in parallel computing system, in another embodiment of the present invention, the recovering apparatus 230 performs recovery in response to the request of reading specific parts of results received by the synthesizing unit from users. In one example, the correspondence acquiring unit 231, in response to a user request, acquires items involved in the user request, obtains entries recording said items by looking up the central dictionary repository, acquires the correspondence relation and corresponding indices recorded in said entries, and sends such information to the result replacing unit 232. The result replacing unit 232 determines parts of the processing results relevant to the specific parts requested by users according to the acquired indices, and performs a replacement on such parts of the results based on the correspondence relation of indices and items. For example, if the user only requests to read the occurrence times of "hello", the correspondence acquiring unit 231 first finds the correspondence relation of "hello" and index "11" in the central dictionary repository based on the requested item "hello", and acquires the index "11"; then the result replacing unit 232 filters out the results relevant to index "11" from processing results as specific parts of the results requested by the user, and performs replacement on such parts of the results, that is, only replaces (11, 2) in processing results with (hello, 2) and provides the results to the user.

Similarly, the recovering apparatus can be likewise provided in other parallel computing system different from MapReduce structure. As to a general parallel computing system containing n stages described above, the recovering apparatus 230 can be set in computing units of the last stage or in the unit for presenting results specially.

As such, with the transmission simplifying system 200, the processing data is simplified at the beginning of parallel computing, and recovered at the end of parallel computing, such that the size of intermediate results transmitted among a plurality of parallel computing units are reduced during the whole parallel computing process. Therefore, the I/O consumption among computing units in the parallel computing system is significantly reduced, thereby solving the I/O bottleneck in the art effectively. It can be understood that, both the simplification ratio of intermediate results and the reduction ratio of I/O in parallel computing system depend on the simplification coding algorithm employed in the simplifying apparatus 210. Examples and description for the simplification coding algorithm are as follows.

In order to achieve simplification, hash algorithm is a common method for data simplification coding. Hash algorithm is a collection of a class of algorithms, each of which maps a binary value of any length to a shorter binary value of fixed length according to a specific mathematic function with such shorter binary value being called as hash value. Hash value is a segment of value representation that is unique and very compact. In a good hash algorithm, it is impossible to construct two different inputs that are independent from one another and have the same hash values at the same time via computing method. Hash algorithm is often used for identity authentication, digital signature and the like. A typical hash algorithm includes MD2, MD4, MD5 and SHA-1. MD5 is a unidirectional hash solution having 128 bits compliant with industry standard. It converts data in a manner that the result is unique and the original form cannot be deduced back.

Taking word statistics problems that are often encountered in parallel computing as an example, the usability of hash algorithm in simplification coding on intermediate results of parallel computing will be described.

According to statistics, the number of most common English words in daily use is only about 2000. We assume that, the number of words that appear possibly in the text according to statistics is 100 times of common words (in actuality, it may be far less than this value), that is, 2000× 100=200,000. Assume that each word is hashed to the size of 4 bytes, that is, 32 bits, then the number of words that might be stored is 4,294,967,296. This means that, degree of sparse when 200,000 possible words are stored with 4 bytes is 4.6566e-5, and the average collision ratio is less than 2e-9. If the distribution rule of letters is further taken into account when designing the hash algorithm, the collision ratio can be further reduced. Therefore, the collision ratio is small enough to enable such simplification coding to assure unique correspondence before and after coding.

Taking words in Wikipedia as an example, the total number of all words in Wikipedia in the English version on November 2008 is 35M, the total occupied space is 211 MB, and each word is 6 bytes on average. If all words are hashed to 4 bytes, and still 5 blade machines are used for processing, then we can see that, the average I/O of each machine is reduced from original 25 MB/s (see the example in the background) to 19 MB/s. If objects to be simplified are web page URLs frequently appearing in parallel computing, the efficiency of simplification will be more significant. If the average length of a URL is 95 bytes, then the I/O traffic will be reduced to 10 percent by hashing the URL to 4 bytes. On the basis of a basic hash algorithm, step hash can be employed as needed to further optimize the results of simplification coding.

Another benefit of employing hash algorithm is the reusage of computing resource. Actually, in the present MapReduce parallel computing system, a large number of intermediate keys and values are generated during mapping. During reducing stage, a specific master or a certain reducer unit acting as such master is responsible for routing the intermediate key-value pair, so as to direct the key-value pairs having the same "key" originating from a plurality of mapper units to the same reducer unit. In order to achieve such "routing", usually, it still needs to hash keys in these key-value pairs during reducing stage, so as to perform grouping on the key-value pairs. Based on the grouping, it can be determined which key-value pair should be sent to which reducer unit for further processing.

In the embodiments of the present invention, intermediate key-value pairs have been simplified using a hash algorithm during the mapping processing stage, and thus been grouped potentially. Then, hashed results can be directly reused during the reducing stage without having to perform the hash operation again. Thus, hash simplification on intermediate key-value pairs during the mapping processing stage makes it possible to reuse the computing resource, thereby further improving the operation efficiency of the MapReduce parallel computing system. In other parallel computing systems, there is also problem of "routing" and transmission of intermediate results. The intermediate results can be grouped and transmitted similarly based on simplification coding on intermediate results.

As described, the hash algorithm is a process of mapping input sequences to indices of fixed length. However, in other simplification coding algorithms, the length of indices is not necessarily fixed. In a type of simplification coding algorithm, a sequence that occurs frequently is mapped to an index with a short length, and a sequence that occurs infrequently is mapped to an index with a long length. In this method, the lengths of indices are not fixed, and it is not certain that the length of each sequence is necessarily more than the length of its corresponding index. However, after making average with the frequency as weight, the average length of indices after simplification coding can be made far less than the length of sequence, thereby functioning as a flexible coding method. Besides hash algorithm that performs mapping according to mathematic function, input sequence can also be simplified in other mapping manners, such as, making the correspondence relation between input sequence and index prescribed by human. This kind of method can be called as hash-like algorithm.

Those skilled in the art can understand that, besides coding algorithms described above, other simplification coding methods can also be employed according to form, content and other features of input data in a parallel computing unit, as long as items and indices before and after simplification can maintain a unique correspondence relation and the average size of indices is less than the average size of items.

With the system 200 composed of the simplifying apparatus 210, the central dictionary repository 220 and the recovering apparatus 230 described above, the I/O consumption in the distributed parallel computing system is reduced significantly, processing bottleneck is eliminated, and the processing efficiency is improved.

Based on the same inventive concept, the invention also provides a corresponding method of simplifying transmission in a parallel computing system.

Figure 6:
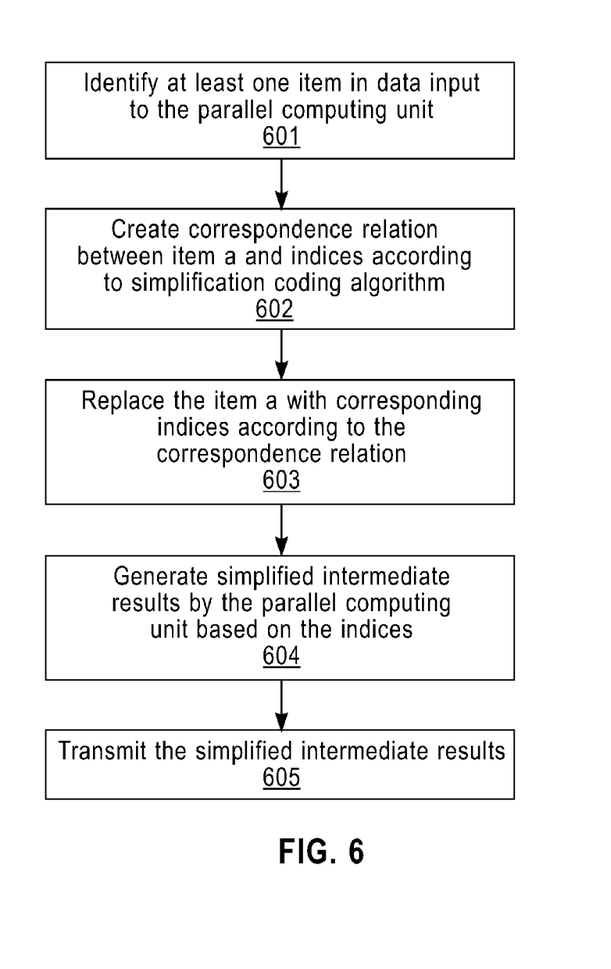
FIG. 6 shows a flowchart of method for simplifying the transmission according to an embodiment of the present invention.

FIG. 6 shows a flowchart of method for simplifying transmission in a distributed parallel computing system according to an embodiment of the present invention, and the distributed parallel computing system includes at least one parallel computing unit for generating intermediate results. As shown, the method includes the following steps. In step 601, at least one item in data input to the parallel computing unit is identified; in step 602, the correspondence relation between the at least one item and indices thereof is created according to simplification coding algorithm, where the average size of the indices being less than the average size of the at least one item; then, in step 603, the at least one item is replaced with corresponding indices thereof according to the correspondence relation; accordingly, in step 604, simplified intermediate results are generated by the parallel computing unit based on the indices; then, in step 605, the simplified intermediate results are transmitted. With such a procedure, the transmission of intermediate results in parallel computing system is simplified.

Further, corresponding to the above simplification process, the method of the present invention also includes a step of recovering the processing results. Specifically, the method further includes the steps of acquiring the correspondence relation between the items and indices; and then replacing the indices in the processing results that are acquired based on the simplified intermediate results with corresponding items according to the correspondence relation. With such steps, the processing results of the parallel computing system are recoverable to be readable to users.

Since principals and implementations of above transmission simplifying method are similar with the description of apparatuses of FIG. 4 and FIG. 5, they will be omitted for brevity.

Those skilled in the art can understand that, the above apparatuses and methods for simplifying intermediate results and recovering processing results can be implemented by executable instructions and/or controlling codes in the processors e.g. codes in mediums like disc, CD or DVD-ROM; memories like ROM or EPROM; and carriers like optical or electronic signal carrier. The system, apparatus and its units can be realized using hardware like VLSI or Gates and Arrays, like semiconductors e.g. Logic Chip, transistors, etc., or like programmable hardware equipments e.g. FPGA, programmable logic equipments, etc.; or using software executed by different kinds of processors; or using the integration of said hardware and software.

Although the method and system of simplifying transmission of the present invention are described in detail in conjunction with specific embodiments, the present invention is not limited thereto. Those skilled in the art can make various changes, replacements and modifications to the present invention without departing from spirit and scope of the invention. It should be understood that, all these changes, replacements and modifications still fall into protection scope of the invention. The protection scope of the present invention is defined by appended claims.

What is claimed is:

1. A computer-implemented method for simplifying transmission in a distributed parallel computing system, wherein said distributed parallel computing system including at least one parallel computing unit for generating intermediate results, said method comprising:
    identifying at least one item in a data input to said parallel computing unit;
    creating a correspondence relation between said at least one item and indices thereof according to a simplification coding algorithm, wherein the average size of said indices is less than the average size of said at least one item;
    replacing said at least one item with said corresponding indices according to said correspondence relation;
    generating simplified intermediate results by said parallel computing unit based on said indices; and
    transmitting said simplified intermediate results.

2. The method according to claim 1, wherein said distributed parallel computing system is a computing system employing a MapReduce model, and wherein said parallel computing unit is a mapper unit.

3. The method according to claim 1, further comprising:
    registering said correspondence relation with a central dictionary repository.

4. The method according to claim 1, further comprising:
    storing said correspondence relation locally in said parallel computing unit.

5. The method according to claim 1, wherein said simplification coding algorithm includes a hash algorithm.

6. The method according to claim 1, wherein the step of replacing said at least one item with said corresponding indices according to said correspondence relation comprises:
    replacing said at least one item with said corresponding indices before said parallel computing unit performs parallel computing.

7. The method according to claim 1, further comprising:
    acquiring said correspondence relation between said at least one item and said indices; and
    replacing said indices in processed results that are acquired based on said simplified intermediate results with corresponding said at least one item according to said correspondence relation.

8. The method according to claim 7, wherein the step of acquiring said correspondence relation comprises:
    acquiring said correspondence relation by looking up entries in a central dictionary repository.

9. The method according to claim 7, wherein the step of acquiring said correspondence relation comprises:
    in response to a user request for a part of said processed results, based on a part of said at least one item involved in said part of said processed results, acquiring a part of said correspondence relation relevant to said part of said at least one item, and acquiring a part of said indices corresponding to said part of said at least one item.

10. The method according to claim 9, wherein the step of replacing said indices in processed results that are acquired based on said simplified intermediate results with corresponding said at least one item according to said correspondence relation comprises:
    acquiring a part of data relevant to said requested part of said processed results from said processed results according to said part of said indices; and
    replacing said part of said indices in said part of said relevant data with a corresponding part of said at least one item according to said part of said correspondence relation.

11. A computer-implemented system for simplifying transmission in a distributed parallel computing system, wherein said distributed parallel computing system including at least one parallel computing unit for generating intermediate results, said system comprising a simplifying apparatus which comprises:
    an item identifying unit configured to identify at least one item in a data input to said parallel computing unit;
    a correspondence creating unit configured to create said correspondence relation between said at least one item and indices thereof according to a simplification coding algorithm, wherein the average size of said indices is less than the average size of said at least one item; and
    an item replacing unit configured to replace said at least one item with said corresponding indices according to said correspondence relation, such that said parallel computing unit can generate simplified intermediate results based on said indices, and transmit said simplified intermediate results.

12. The system according to claim 11, wherein said distributed parallel computing system is a computing system employing a MapReduce model, and wherein said parallel computing unit is a mapper unit.

13. The system according to claim 11, wherein said correspondence creating unit is further configured to register said correspondence relation with a central dictionary repository.

14. The system according to claim 11, wherein said correspondence creating unit is further configured to store said correspondence relation locally in said parallel computing unit.

15. The system according to claim 11, wherein said simplification coding algorithm includes a hash algorithm.

16. The system according to claim 11, wherein said item replacing unit is further configured to replace said at least one item with said corresponding indices before said parallel computing unit performs parallel computing.

17. The system according to claim 11, further comprising a recovering apparatus, said recovering apparatus comprising:
 a correspondence acquiring unit configured to acquire said correspondence relation between said at least one item and said indices; and
 a result replacing unit configured to replace said indices in processed results that are acquired based on said simplified intermediate results with corresponding said at least one item according to said correspondence relation.

18. The system according to claim 17, wherein said correspondence acquiring unit is configured to acquire said correspondence relation by looking up entries in a central dictionary repository.

19. The system according to claim 17, wherein said correspondence acquiring unit is configured to, in response to a user request for a part of said processed results, based on a part of said at least one item involved in said part of said processed results, (i) acquire a part of said correspondence relation relevant to said part of said at least one item, and (ii) acquire a part of said indices corresponding to said part of said at least one item.

20. The system according to claim 19, wherein said result replacing unit is configured to (i) acquire a part of data relevant to said requested part of said processed results from said processed results according to said part of said indices, and (ii) replace said part of said indices in said part of said relevant data with a corresponding part of said at least one item according to said part of said correspondence relation.

21. An article of manufacture tangibly embodying computer readable instructions which when implemented, causes a computer to perform the steps of a computer-implemented method for simplifying transmission in a distributed parallel computing system, wherein said distributed parallel computing system includes at least one parallel computing unit for generating intermediate results, said method comprising the steps of:
 identifying at least one item in a data input to said parallel computing unit;
 creating a correspondence relation between said at least one item and indices thereof according to a simplification coding algorithm, wherein the average size of said indices is less than the average size of said at least one item;
 replacing said at least one item with said corresponding indices according to said correspondence relation;
 generating simplified intermediate results by said parallel computing unit based on said indices; and
 transmitting said simplified intermediate results.

* * * * *